United States Patent
Ohki et al.

(10) Patent No.: US 7,585,114 B2
(45) Date of Patent: Sep. 8, 2009

(54) COMPRESSOR BEARING AND COMPRESSOR COMPONENT

(75) Inventors: Chikara Ohki, Kuwana (JP); Tomoaki Goto, Iwata (JP)

(73) Assignee: NTN Corporation, Osaka (JP)

( * ) Notice: Subject to any disclaimer, the term of this patent is extended or adjusted under 35 U.S.C. 154(b) by 700 days.

(21) Appl. No.: 10/809,797

(22) Filed: Mar. 26, 2004

(65) Prior Publication Data

US 2004/0247456 A1    Dec. 9, 2004

(30) Foreign Application Priority Data

Mar. 28, 2003   (JP)   ............... 2003-091300
Mar. 22, 2004   (JP)   ............... 2004-083101

(51) Int. Cl.
F16C 33/62   (2006.01)

(52) U.S. Cl. ...................... 384/492; 384/625

(58) Field of Classification Search ............ 474/69–70; 148/318–319, 219, 333, 320, 336, 659; 384/450, 384/492, 569, 544, 571–572, 658, 25, 656, 384/625; 417/269–270, 238
See application file for complete search history.

(56) References Cited

U.S. PATENT DOCUMENTS

| | | | | |
|---|---|---|---|---|
| 4,023,988 A | * | 5/1977 | Stickels et al. | ............. 148/622 |
| 4,867,649 A | * | 9/1989 | Kawashima et al. | ........ 417/270 |
| 4,955,414 A | * | 9/1990 | Fujii | ...................... 148/324 |
| 5,422,524 A | * | 6/1995 | Nakamura et al. | ............ 310/90 |
| 6,056,514 A | * | 5/2000 | Fukai | ........................ 417/223 |
| 6,065,343 A | * | 5/2000 | Kiuchi et al. | ................. 73/622 |
| 6,224,688 B1 | * | 5/2001 | Takemura et al. | ............ 384/492 |
| 6,247,899 B1 | * | 6/2001 | Ban et al. | .................... 417/16 |
| 6,277,216 B1 | * | 8/2001 | Leap et al. | ................. 148/335 |
| 6,280,152 B1 | * | 8/2001 | Sugiura et al. | .............. 417/269 |
| RE37,967 E | * | 1/2003 | Nakamura et al. | ............ 310/90 |
| 6,969,201 B2 | * | 11/2005 | Tajima | ....................... 384/544 |
| 7,004,637 B1 | * | 2/2006 | Uyama et al. | ............... 384/544 |
| 7,147,382 B2 | * | 12/2006 | Suzuki et al. | ............... 384/569 |
| 7,270,607 B2 | * | 9/2007 | Murakami et al. | .......... 464/111 |

(Continued)

FOREIGN PATENT DOCUMENTS

JP    61177327 A   *   8/1986

(Continued)

OTHER PUBLICATIONS

Japanese Office Action, with English Translation, issued in Japanese Patent Application No. JP 2004-083101 dated on Dec. 16, 2008.

(Continued)

*Primary Examiner*—Marcus Charles
(74) *Attorney, Agent, or Firm*—McDermott Will & Emery LLP

(57) ABSTRACT

A compressor component incorporated into a compressor having a compressor body and a compressor pulley mechanism transmitting a driving force to the compressor body has an austenite grain with a grain size number falling within a range exceeding 10, a fracture stress value of at least 2650 MPa, or a hydrogen content of at most 0.5 ppm. This provides a compressor component and a compressor bearing with a long fatigue life, a high anti-crack strength, and a reduced secular dimensional variation.

8 Claims, 10 Drawing Sheets

U.S. PATENT DOCUMENTS

| | | | |
|---|---|---|---|
| 7,296,933 B2 * | 11/2007 | Tsujimoto | 384/571 |
| 7,334,943 B2 * | 2/2008 | Okugami et al. | 384/492 |
| 2001/0015241 A1 * | 8/2001 | Tajima et al. | 148/319 |
| 2003/0089428 A1 | 5/2003 | Murakami et al. | |
| 2003/0123769 A1 * | 7/2003 | Ohki | 384/492 |
| 2003/0123796 A1 * | 7/2003 | Wang et al. | 385/37 |
| 2003/0201036 A1 * | 10/2003 | Hashimura et al. | 148/333 |
| 2004/0079310 A1 * | 4/2004 | Suzuki et al. | 123/90.41 |
| 2004/0179761 A1 * | 9/2004 | Ohki et al. | 384/492 |

FOREIGN PATENT DOCUMENTS

| | | |
|---|---|---|
| JP | 01-201423 | 8/1989 |
| JP | 05-172048 | 7/1993 |
| JP | 06-341441 | 12/1994 |
| JP | 8-4774 | 1/1996 |
| JP | 08-049057 | 2/1996 |
| JP | 08-92690 A * | 4/1996 |
| JP | 09-176740 | 7/1997 |
| JP | 10-030150 | 2/1998 |
| JP | 10-068419 | 3/1998 |
| JP | 10-204612 | 4/1998 |
| JP | 11-101247 | 4/1999 |
| JP | 2003227518 A * | 8/2003 |
| WO | WO 02/40730 A1 | 5/2002 |

OTHER PUBLICATIONS

Japanese Notice of Grounds of Rejection, w/English abstract, issued in Japanese Patent Application No. JP 2004-083101 dated Apr. 7, 2009.

* cited by examiner 0.05mm 0.05mm

COMPRESSOR BEARING AND COMPRESSOR COMPONENT

BACKGROUND OF THE INVENTION

1. Field of the Invention

The present invention relates to a compressor bearing used for a compressor body and a pulley mechanism transmitting a driving force to the compressor body, and a compressor component.

2. Description of the Background Art

To increase the life of a rolling bearing incorporated into a compressor with a pulley mechanism (referred to as a compressor bearing hereinafter), a thermal treatment is performed. Conventionally, for example, in quenching the components they are heated in an ambient RX gas with ammonium gas further introduced therein to carbo-nitride their surface layer portion. This carbonitriding process can harden the surface layer portion and generate retained austenite in a microstructure to provide increased rolling contact fatigue life (Japanese Patent Laying-Open Nos. 11-101247 and 8-4774).

The above-mentioned carbonitriding process for the compressor bearing components is a process to diffuse carbon and nitrogen. This requires a high temperature maintained for a long period of time.

When bearing components are held at a high temperature for a long time, an austenite grain is coarsened resulting in reduced toughness and thus brittle steel. This leads to reduced crack strength.

In addition, the coarsened austenite grain results and increased anti-crack strength is hardly obtained. Furthermore, as more austenite is retained, secular dimensional variation rate increases.

The carbonitriding process of diffusing carbon and nitrogen requires that bearing components should be maintained at a high temperature for a long period of time. This results in a coarsened structure and imposes a limitation on increasing a fracture stress value, which corresponds to anti-crack strength.

On the other hand, there are demands on the compressor bearing with a pulley mechanism (1) to secure an increased life time against rolling fatigue, (2) to improve anti-crack strength, and (3) restrain an increase in secular dimensional variation rate.

In conventional techniques, to achieve such mechanical characteristics, compositions are adjusted in designing steel alloys. However, a raw material of a special alloy component is hardly available thereby leading to high costs.

A future compressor bearing with a pulley mechanism is requested to have a mechanical characteristic that allows for the use under a higher load and at a higher temperature than the conventional bearings in order to accommodate an environment of a higher load and higher temperature.

Therefore, the above-described compressor bearing needs to be strong and requires (1) a long rolling contact fatigue life, (2) a high anti-crack strength, and (3) dimensional stability enhanced by restraining an increase in secular dimensional variation rate.

SUMMARY OF THE INVENTION

The present invention aims to provide a compressor bearing and a compressor component with a high strength and having (1) a long fatigue life (a long rolling fatigue life in a compressor bearing), (2) a high anti-crack strength, and (3) dimensional stability enhanced by restraining an increase in secular dimensional variation rate.

The present invention provides a compressor component incorporated into a compressor having a compressor body and a pulley mechanism transmitting a driving force to the compressor body. The component has an austenite grain with a grain size number falling within a range exceeding 10.

The present invention provides a compressor bearing for use in a compressor having a compressor body and a pulley mechanism transmitting a driving force to the compressor body. At least one member of a member having a railway surface and a plurality of rolling elements included in the compressor bearing has an austenite grain with a grain size number falling within a range exceeding 10.

In the compressor component and the compressor bearing according to the present invention, a small austenite grain size allows significantly increased anti-crack strength, dimensional stability and fatigue life (or rolling contact fatigue life when the component is a compressor bearing). With the austenite grain size number of 10 or less, any remarkable improvement of the fatigue life is impossible and thus the grain size number is greater than 10, and preferably 11 or greater. Although further finer austenite grains are desirable, the grain size number exceeding 13 is usually difficult to achieve. Note that an austenite grain of the compressor component and the compressor bearing does not vary whether it may be in a surface layer portion significantly affected as it is carbonitrided or a portion inner than the surface layer portion. As such, the surface layer portion and the inner portion will be set as positions serving as subjects of the aforementioned grain number range.

The present invention provides another compressor component incorporated into a compressor having a compressor body and a pulley mechanism transmitting a driving force to the compressor body. The component has a fracture stress value of at least 2650 MPa.

The present invention provides another compressor bearing for use in a compressor having a compressor body and a pulley mechanism transmitting a driving force to the compressor body. At least one member of a member having a railway surface and a plurality of rolling elements included in the compressor bearing has a fracture stress value of at least 2650 Mpa.

The present inventors have found that steel that is carbonitrided at a temperature exceeding an $A_1$ transformation point and then cooled to a temperature of less than the $A_1$ transformation point, and subsequently reheated to a range of temperature higher than the $A_1$ transformation point and is quenched, can be provided with a nitriding layer allowing the steel to provide a fracture stress value of no less than 2650 MPa, which has conventionally not been achieved. A compressor component and a compressor bearing superior in fracture stress to conventional and thereby larger in strength can thus be obtained.

The present invention provides a further compressor component incorporated into a compressor having a compressor body and a pulley mechanism transmitting a driving force to the compressor body. The component has a hydrogen content of at most 0.5 ppm.

The present invention provides a further compressor bearing for use in a compressor having a compressor body and a pulley mechanism transmitting a driving force to the compressor body. At least one member of a member having a railway surface and a plurality of rolling elements included in the compressor bearing has a hydrogen content of at most 0.5 ppm.

In the further compressor component and compressor bearing according to the present invention, embrittlement of steel attributed to hydrogen can be alleviated. If steel has a hydrogen content exceeding 0.5 ppm the steel has reduced anti-crack strength. Such a steel is insufficiently suitable for a part experiencing heavy loads. A lower hydrogen content is desirable. However, reduction of the hydrogen content to the one less than 0.3 ppm requires long-term heat treatment, resulting in increase in size of austenite grains and thus deterioration in toughness. Then, a hydrogen content is desirably in a range from 0.3 to 0.5 ppm and more desirably in a range from 0.35 to 0.45 ppm.

In measuring the above hydrogen content, diffusible hydrogen is not measured and only the non-diffusible hydrogen released from the steel at a predetermined temperature or higher is measured. Diffusible hydrogen in a sample of small size is released from the sample to be scattered even at room temperature, and therefore the diffusible hydrogen is not measured. Non-diffusible hydrogen is trapped in any defect in the steel and only released from the sample at a predetermined heating temperature or higher. Even if only the non-diffusible hydrogen is measured, the hydrogen content considerably varies depending on the method of measurement. The above mentioned range of hydrogen content is determined by thermal conductimetry. In addition, as detailed later, the measurement may be taken by means of a LECO DH-103 hydrogen determinator or like measuring device.

The above-described compressor bearing is preferably a swash plate support bearing rotatably supporting a swash plate and a rotating member of the compressor body.

The above-described compressor bearing is preferably a rotating member/pulley support member bearing rotatably supporting a rotating member of the compressor body and a pulley bearing support member of the pulley mechanism.

The above-described compressor bearing is preferably a main shaft support bearing rotatably supporting a main shaft of the compressor body and a pulley bearing support member of the pulley mechanism.

The above-described compressor bearing is preferably a pulley support bearing rotatably supporting a pulley and a pulley bearing support member of the pulley mechanism.

In the above-described compressor bearing, the swash plate support bearing is a needle roller thrust bearing.

In the above-described compressor bearing, the rotating member/pulley support member bearing is a needle roller thrust bearing.

The present invention provides a method of manufacturing a compressor component (including a compressor bearing) incorporated into a compressor having a compressor body and a pulley mechanism transmitting a driving force to the compressor body. The component is formed at least by carbonitriding steel for a bearing's component at a temperature higher than an $A_1$ transformation point and then cooling the steel to a temperature lower than the $A_1$ transformation point and subsequently reheating the steel to a range of temperature of no less than the $A_1$ transformation point and less than the temperature applied to carbo-nitride the steel, and quenching the steel.

In the present method of manufacturing the compressor component (including the compressor bearing), after steel is carbonitrided the steel is cooled to a temperature of less than the $A_1$ transformation point before it is finally quenched. A fine austenite grain size can be obtained and as a result, Charpy impact value, fracture toughness, anti-crack strength, fatigue life (or rolling contact fatigue life when the component is a compressor bearing) and the like can be improved.

Furthermore for example by cooling to a temperature at which austenite transforms, austenite grain boundary in carbonitriding can be irrelevant to that in final quenching. Furthermore, the final quenching temperature is lower than the carbonitriding temperature, and thus the amount of un-dissolved cementite in the surface layer, which is influenced by the carbonitriding process, increases as compared with that in the carbonitriding process. As such the ratio of un-dissolved cementite increases while the ratio of austenite decreases at the heating temperature in the final quenching as compared with those ratios in the carbonitriding process. In addition, it is seen from the Fe—C binary phase diagram that, in the range where cementite and austenite coexist, the concentration of carbon in solid solution of the carbon and austenite decreases as the quenching temperature decreases.

When the temperature is increased to the final quenching temperature, austenite grains are made fine since there remain a large amount of un-dissolved cementite that prevent growth of austenite grains. Moreover, the structure transformed from austenite to martensite or bainite through quenching has a low carbon concentration, so that the structure has high toughness as compared with the structure quenched from the carbonitriding temperature.

In the present method of manufacturing the compressor component, preferably the steel is heated to a range of temperature of 790° C. to 830° C. before it is quenched.

The steel is again heated to a temperature hardly allowing an austenite grain to be grown before the steel is quenched. Fine austenite grain size can thus be achieved.

The member having a railway surface in this specification includes an inner member functioning as an inner ring, an outer member functioning as an outer ring, and a bearing washer of a thrust bearing. The inner member, the outer member, or the bearing washer may be provided separately from a member such as a shaft or housing, or may function integrally with a member such as a shaft or housing.

The austenite grain also refers to a trace thereof remaining after the austenite is transformed into ferrite phase such as martensite or bainite through quenching. An austenite grain boundary before quenching is sometimes referred to as a "prior austenite grain boundary" to be distinguished from the remaining austenite grain after quenching. That is, the "austenite grain" and the "prior austenite grain boundary" are used to mean the same.

The prior austenite grain boundaries can be observed after being subjected to a process developing a grain boundary such as an etching process for a metal phase sample of the member of interest. For measurement of the grain size, the average of ASTM (American Society for Testing and Materials)–defined grain size numbers (=average grain size of at most 8 μm) may be converted to obtain an average grain diameter, or the intercept method or the like may be used in which a straight line is placed on a metal phase structure in an arbitrary direction to obtain an average length between points at which the straight line meets grain boundaries.

The above-described nitriding layer is formed by a carbonitriding process as will be described below. The nitriding layer may or may not be enriched with carbon.

The compressor component and the compressor bearing according to the present invention may not have all the effects as described hereinafter at the same time and may have one or more effects of the present invention as described hereinafter.

Although the conventional techniques hardly achieve enhanced anti-crack strength due to an increased size of austenite grain, the present invention can achieve a reduction in secular dimensional variation rate due to increasing retained austenite, since the austenite grain has a grain size number falling within a range exceeding 10.

Furthermore, although the conventional techniques use a hardly-available and costly raw material for a special alloy component in order to increase rolling contact fatigue life, to enhance anti-crack strength, and to restrain an increase in secular dimensional variation rate, the present invention can achieve a fracture stress value larger than one in the conventional and enhanced anti-crack strength, since the fracture stress value can be 2650 MPa or more.

In addition, although the conventional techniques are not suitable for use in a part experiencing heavy loads since a hydrogen content over 0.5 ppm results in a brittle steel with reduced anti-crack strength, the present invention can achieve enhanced anti-crack strength because of the hydrogen content of 0.5 ppm or less.

Using the bearing member subjected to the heat treatment as described above, the compressor component and the compressor bearing can attain the mechanical characteristics of (1) a long life against rolling fatigue, (2) an improved anti-crack strength and (3) a restrained increase in secular dimensional variation rate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described with reference to the figures.

Figure 1:
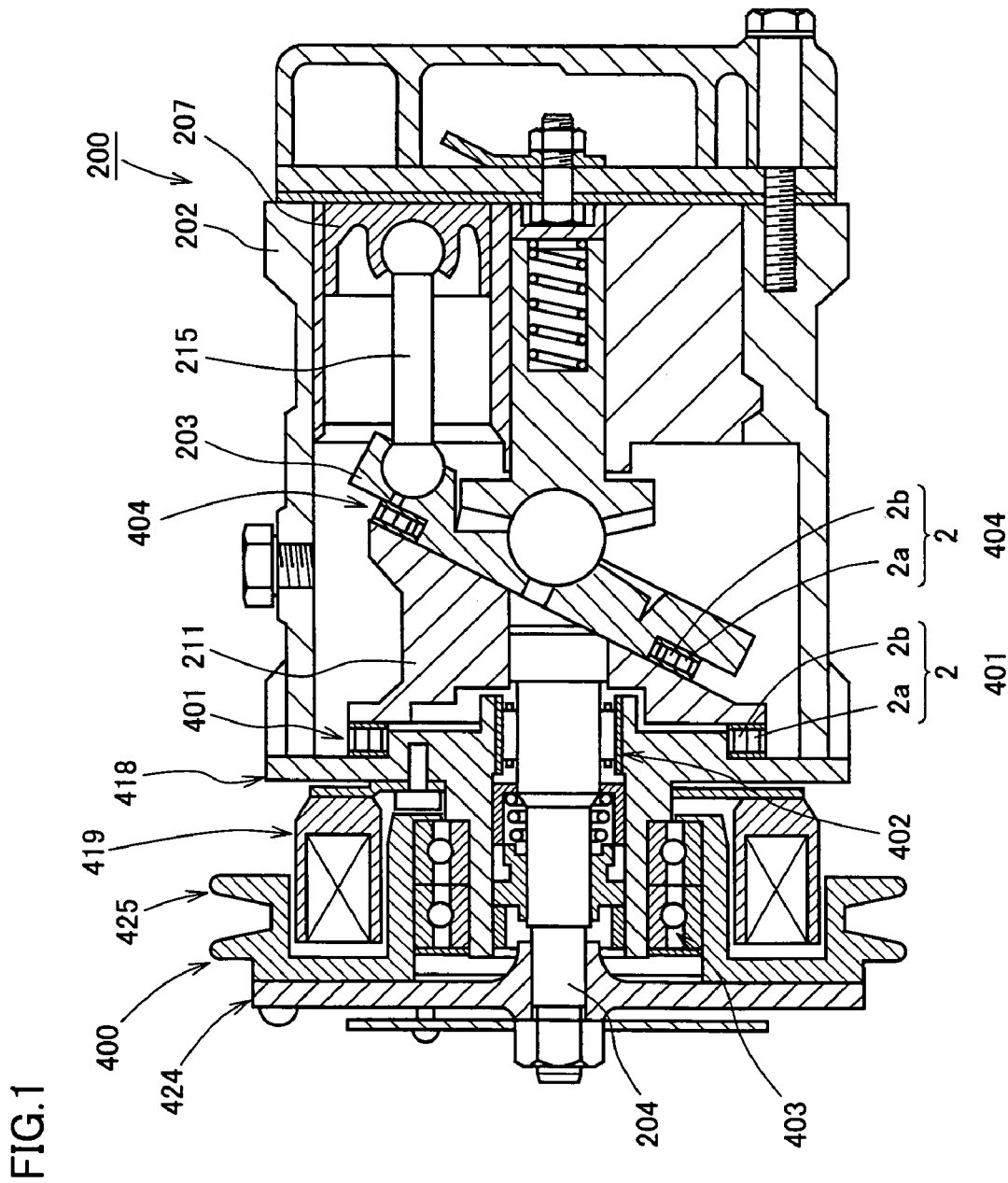
FIG. 1 is a cross sectional view schematically showing a compressor with a pulley mechanism in which a compressor component (including a compressor bearing) according to an embodiment of the present invention is incorporated.

Referring to FIG. 1, the compressor includes a single swash plate-type swash plate compressor 200 and a compressor pulley mechanism 400.

[1] Compressor

The single swash plate-type swash plate compressor 200 will first be described.

Referring to FIG. 1, the single swash-plate type swash plate compressor 200 includes a housing 202, a pulley bearing support member 418, for example, fixedly screwed to housing 202, a main shaft 204, a rotating member 211 attached to main shaft 204, a swash plate 203 swinging according to rotation of rotating member 211, a piston rod 215 coupled to swash plate 203, and a piston 207 coupled to the opposite side of piston rod 215.

A rotating member/pulley support member bearing 401 formed of a multiple-row needle roller thrust bearing is arranged as a support structure receiving a thrust load between rotating member 211 and pulley bearing support member 418. A swash plate support bearing 404 formed of a multiple-row needle roller thrust bearing is arranged as a support structure receiving a thrust load between swash plate 203 and rotating member 211.

In compressor 200, rotating member 211 rotates with rotation of main shaft 204 whereby swash plate 203 swings. This swing motion of swash plate 203 causes piston rod 215 to reciprocate to allow piston 207 coupled to piston rod 215 to reciprocate in a cylinder.

[2] Compressor Pulley Mechanism

Compressor pulley mechanism 400 will now be described.

Referring to FIG. 1, pulley bearing support member 418 is fixedly screwed to housing 202 of the compressor. Furthermore, a clutch electromagnet is fixedly attached to pulley bearing support member 418. On the other hand, a power transmitting member 424 is fitted to the end of main shaft 204. A pulley 425 is fitted on the outer circumference of pulley support bearing 403.

A main shaft support bearing 402 is arranged between main shaft 204 and pulley bearing support member 418. Furthermore, a pulley support bearing 403 is arranged between pulley 425 and pulley bearing support member 418.

In pulley mechanism 400, by exciting or not exciting clutch electromagnet 419, the rotary driving force of pulley 425 rotated by a not-shown driving force is transmitted to main shaft 204 to operate the compressor, or the rotary driving force of pulley 425 is not transmitted to main shaft 204 to terminate the operation of the compressor.

[3] Compressor Bearing

The compressor bearing is broadly divided into a compressor bearing for use in compressor body 200 and a compressor bearing for use in pulley mechanism 400.

The compressor bearing for use in compressor body 200 includes swash plate support bearing 404 rotatably supporting swash plate 203 and rotating member 211, and rotating member/pulley support member bearing 401 rotatably supporting rotating member 211 and pulley bearing support member 418.

The compressor bearing for use in pulley mechanism 400 includes main shaft support bearing 402 rotatably supporting main shaft 204 and pulley bearing support member 418, and pulley support member 403 rotatably supporting pulley 425 and pulley bearing support member 418.

A needle roller thrust bearing shown in FIGS. 9A-9C as described later is used for rotating member/pulley support member bearing 401 and for swash plate support bearing 404. A needle roller bearing or a cylindrical roller bearing shown in FIG. 7 as described later is used for main shaft support bearing 402. A deep groove ball bearing shown in FIG. 6A or a multiple-row angular contact ball bearing shown in FIG. 6B, as described later, is used for pulley support bearing 403. Alternatively, a four-point contact ball bearing shown in FIG. 8 may be used.

Figure 6A:
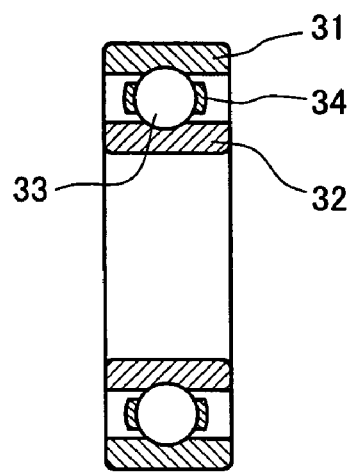
FIG. 6A is a cross sectional view showing a deep groove ball bearing.
Figure 6B:
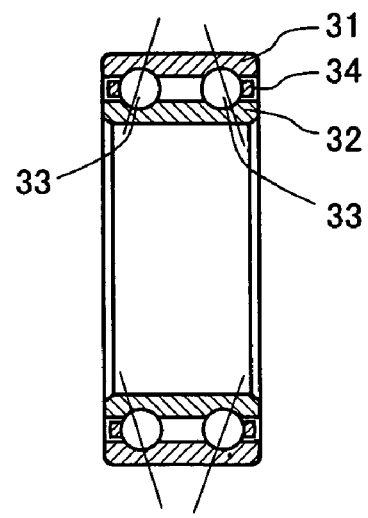
FIG. 6B is a cross sectional view showing a multiple-row angular contact ball bearing.

The deep groove ball bearing shown in FIG. 6A has an outer ring 31 (a member having a raceway surface: an outer member), an inner ring 32 (a member having a raceway surface: an inner member), a plurality of balls 33 serving as rolling elements, and a retainer 34. The multiple-row angular contact ball bearing shown in FIG. 6B has an outer ring (a member having a railway surface: an outer member) 31, an inner ring (a member having a raceway surface: an inner member) 32, a plurality of balls 33 serving as rolling elements, and a retainer 34. A plurality of balls 33 serving as rolling elements are arranged in multiple rows.

Figure 7:
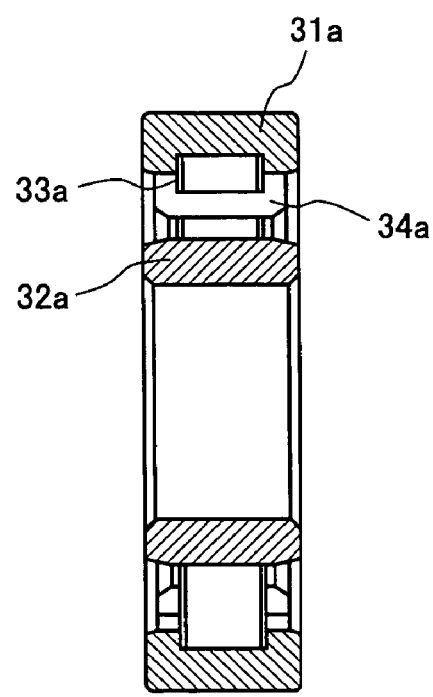
FIG. 7 is a cross sectional view showing a cylindrical roller bearing.

The cylindrical roller bearing shown in FIG. 7 has an outer ring 31a (a member having a railway surface: an outer member), an inner ring 32a (a member having a railway surface: an inner member), a plurality of cylindrical rollers 33a serving as rolling elements, and a retainer 34a.

Figure 8:
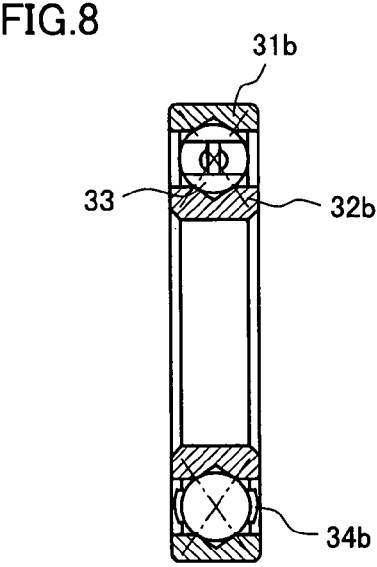
FIG. 8 is a cross sectional view showing a four-point contact ball bearing.

The four-point contact ball bearing shown in FIG. 8 has an outer ring 31b (a member having a railway surface: an outer member), an inner ring 32b (a member having a railway surface: an inner ring), a plurality of balls 33 serving as rolling elements, and a retainer 34b.

Although the bearings shown in FIGS. 6A, 6B, 7 and 8 have been described as having outer rings 31, 31a, 31b and inner rings 32, 32a, 32b, each of the bearings may not have an outer ring and an inner ring. In this case, main shaft 204 in main shaft support bearing 402 and pulley bearing support member 418 in pulley support bearing 403 each are a member having a railway surface (rolling contact surface) on the outer circumferential surface thereof to serves as an inner member functioning as an inner ring. On the other hand, pulley bearing support member 418 in main shaft support bearing 402 and pulley 425 in pulley support bearing 403 each are a member having a railway surface (rolling contact surface) on the inner circumferential surface thereof to serve as an outer member functioning as an outer ring.

Figure 9A:
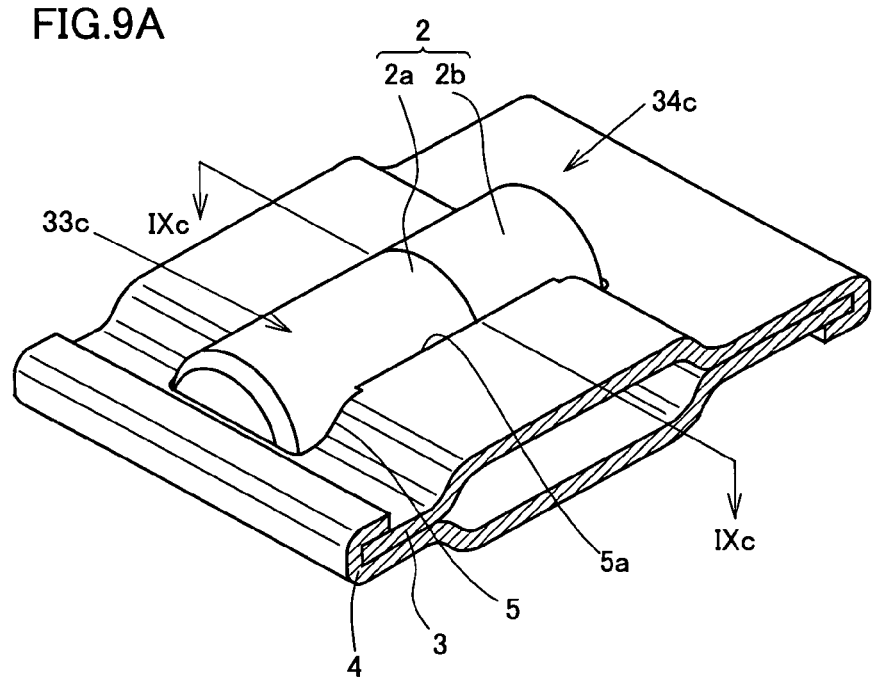
FIG. 9A is a cross sectional perspective view partially showing a needle roller thrust bearing.
Figure 9B:
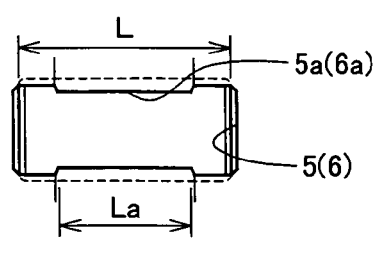
FIG. 9B is an enlarged cross sectional view of the needle roller portion of FIG. 9A.
Figure 9C:
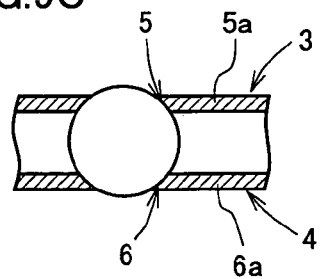
FIG. 9C is an enlarged cross sectional view taken along line IXc-IXc of FIG. 9A.

The needle roller thrust bearing shown in FIGS. 9A-9C has a plurality of needle rollers 2 serving as rolling elements, and an annular needle roller retainer 34c retaining these needle rollers 2 at a prescribed pitch in the circumferential direction. Each of needle rollers 2 is divided into an outer diameter-side needle roller 2a and an inner diameter-side needle roller 2b and arranged in multiple rows. Needle roller retainer 34c is formed of two annular retainers 3 and 4.

These two retainers 3 and 4 have a plurality of rectangular pockets 5 and 6 each having a length longer than a length L of needle roller 2 in the circumferential direction. Roller retaining portions 5a and 6a each having a length La are formed to protrude in opposite directions at the both edges of pockets 5 and 6. Needle roller 2 is retained such that it is sandwiched in the circumferential direction by retaining portions 5a and 6a.

The compressor bearing for use in compressor body 200 employs a needle roller thrust bearing having a large roller diameter in order to endure impact from piston 207. The needle roller thrust bearing is structured such that needle roller 2 is in line contact with the railway surface as described later. On the railway surface in line contact with needle roller 2, the farther from the rotation center of the bearing toward the outer diameter, the greater is the circumferential velocity.

The needle roller thrust bearing as the compressor bearing for use in compressor body 200 does not have a bearing washer as with a normal bearing, and therefore a plurality of needle rollers 2 are retained in retainers 34c and rotate in line contact with the railway surface. In swash plate support bearing 404, each of swash plate 203 and rotating member 211 serves as a member having a railway surface. In rotating member/pulley support member bearing 401, each of rotating member 211 and pulley bearing support member 418 serves as a member having a railway surface.

Figure 10:
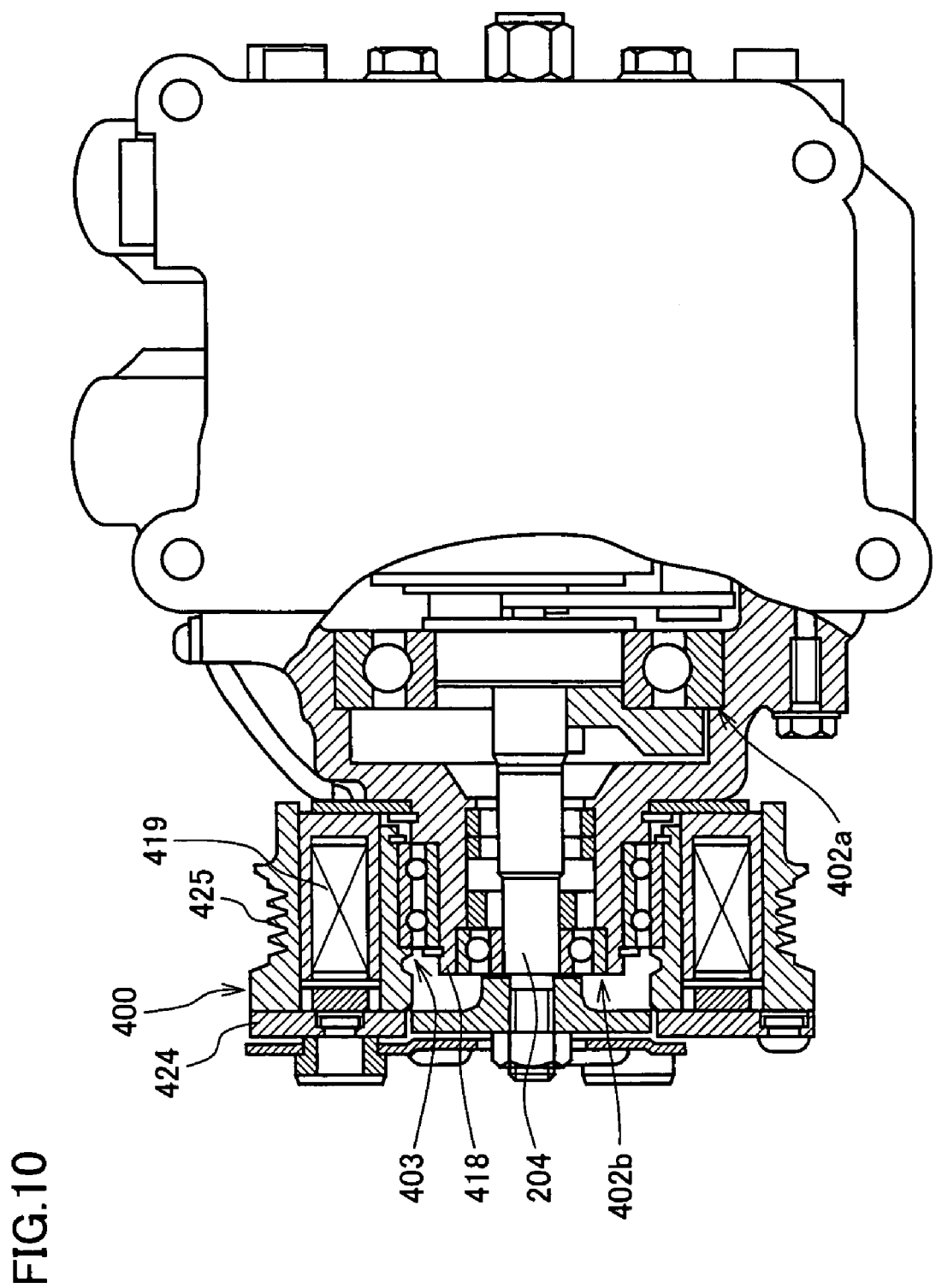
FIG. 10 is a partial cross sectional view showing a configuration of another exemplary compressor with a pulley mechanism.

[4] Modified Application (1) Compressor Bearing Including a Pulley Mechanism
Referring to FIG. 10, the compressor includes a compressor (not shown) and compressor pulley mechanism 400.

(2) Compressor Pulley Mechanism
Referring to FIG. 10, pulley bearing support member 418 is fixed to the housing of the compressor. Clutch electromagnetic 419 is fixedly attached to pulley bearing support member 418. On the other hand, power transmitting member 424 is fitted to the end of main shaft 204. Pulley 425 is fitted on the outer circumference of pulley support bearing 403.

Although pulley mechanism in FIGS. 1 and 10 includes clutch electromagnet 419, a pulley mechanism without a clutch electromagnet may be used.

(3) Compressor
Although the single swash plate-type swash plate compressor for car air-conditioner as shown in FIG. 1 may be used as a compressor, the present invention is not limited thereto. The other type of swash plate compressor or a scroll-type compressor may be used. The other type of swash plate compressor includes, for example, a double swash plate-type swash plate compressor, a single swash plate-type variable-displacement swash plate compressor, and the like.

(4) Compressor Bearing
Main shaft bearings 402a, 402b and pulley support bearing 403 are provided as a compressor bearing. The deep groove ball bearing shown in FIG. 6A, for example, is used for main shaft support bearings 402a, 402b. The multiple-row angular contact ball bearing shown in FIG. 6B, for example, is used for pulley support bearing 403. The compressor bearing is not limited to the embodiment, and any appropriate bearing may be used.

[5] Feature of the Present Embodiment

At least one member of the member having a railway surface (main shaft 204, pulley 425, swash plate 203, rotating member 211, pulley bearing support member 418, outer rings 31, 31a, 31b, inner rings 32, 32a, 32b), and the rolling element (ball 33, cylindrical roller 33a, needle rollers 2a, 2b), included in compressor bearings 401, 402, 402a, 402b, 403, 404 of the present embodiment, has a nitriding layer and an austenite grain with a grain size number falling within a range exceeding 10.

At least one member of the member having a railway surface (main shaft 204, pulley 425, swash plate 203, rotating member 211, pulley bearing support member 418, outer rings 31, 31a, 31b, inner rings 32, 32a, 32b), and the rolling element (ball 33, cylindrical roller 33a, needle rollers 2a, 2b), included in compressor bearings 401, 402, 402a, 402b, 403, 404 of the present embodiment, has a nitriding layer and a fracture stress value of at least 2650 MPa.

At least one member of the member having a railway surface (main shaft 204, pulley 425, swash plate 203, rotating member 211, pulley bearing support member 418, outer rings 31, 31a, 31b, inner rings 32, 32a, 32b), and the rolling element (ball 33, cylindrical roller 33a, needle rollers 2a, 2b), included in compressor bearings 401, 402, 402a, 402b, 403, 404 of the present embodiment, has a nitriding layer and a hydrogen content of at most 0.5 ppm.

Furthermore, the compressor component in the present embodiment (at least one of the member having a railway surface and the rolling element, piston rod 215 of compressor bearings 401-404, piston 207, power transmitting member 424, and the like) has a nitriding layer and an austenite grain with a grain size number falling within a range exceeding 10.

The compressor component in the present embodiment (at least one of the member having a railway surface and the rolling element of compressor bearings 401-404, piston rod 215, piston 207, power transmitting member 424, and the like) has a nitriding layer and a fracture stress value of at least 2650 MPa.

The compressor component in the present embodiment (at least one of the member having a railway surface and the rolling element, piston rod 215 of compressor bearings 401-404, piston 207, power transmitting member 424, and the like) has a nitriding layer and a hydrogen content of at most 0.5 ppm.

[6] Heat Treatment Performed on the Compressor Bearing

In the following, a description will be given about a heat treatment including a carbonitriding process performed on the compressor component (including the compressor bearing) according to the present embodiment. This heat treatment provides the compressor component (including the compressor bearing) of the present embodiment with the above-described characteristics (the hydrogen content; the austenite grain size, the fracture stress value).

Figure 2:
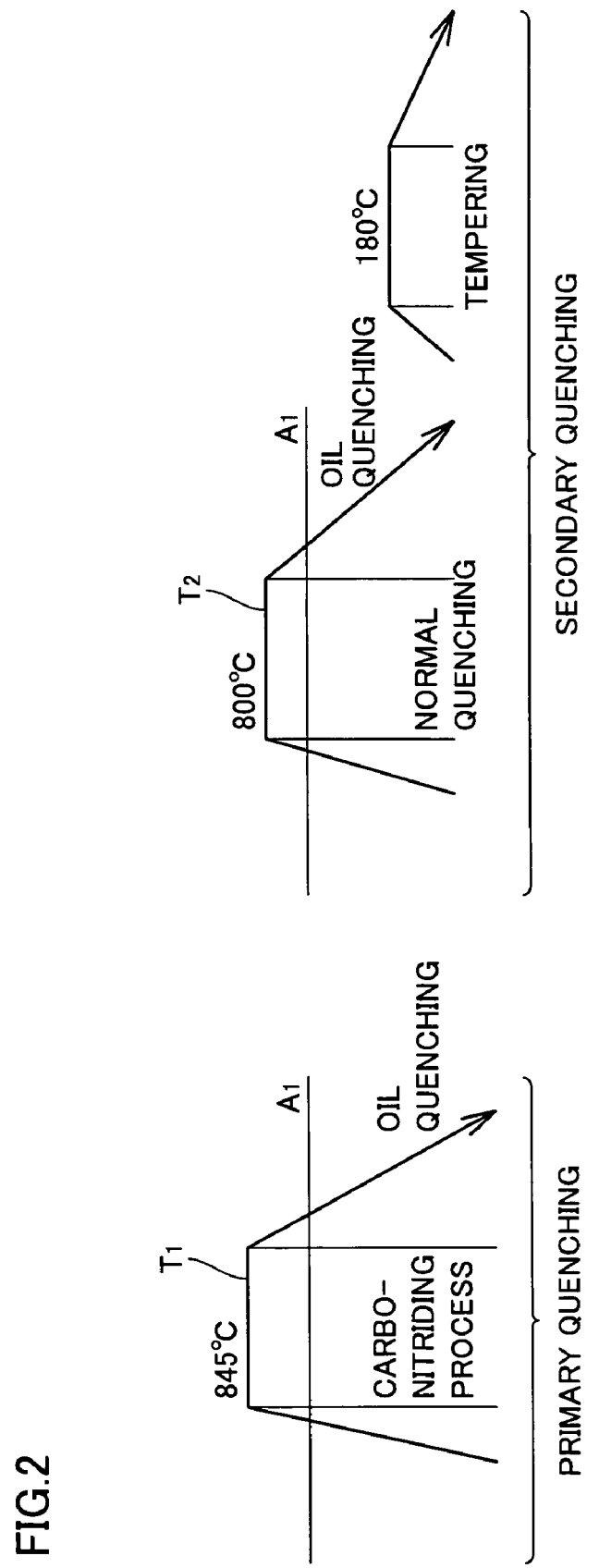
FIG. 2 is a diagram for illustrating a method of a thermal treatment applied to the compressor component (including the compressor bearing) in the embodiment of the present invention.
Figure 3:
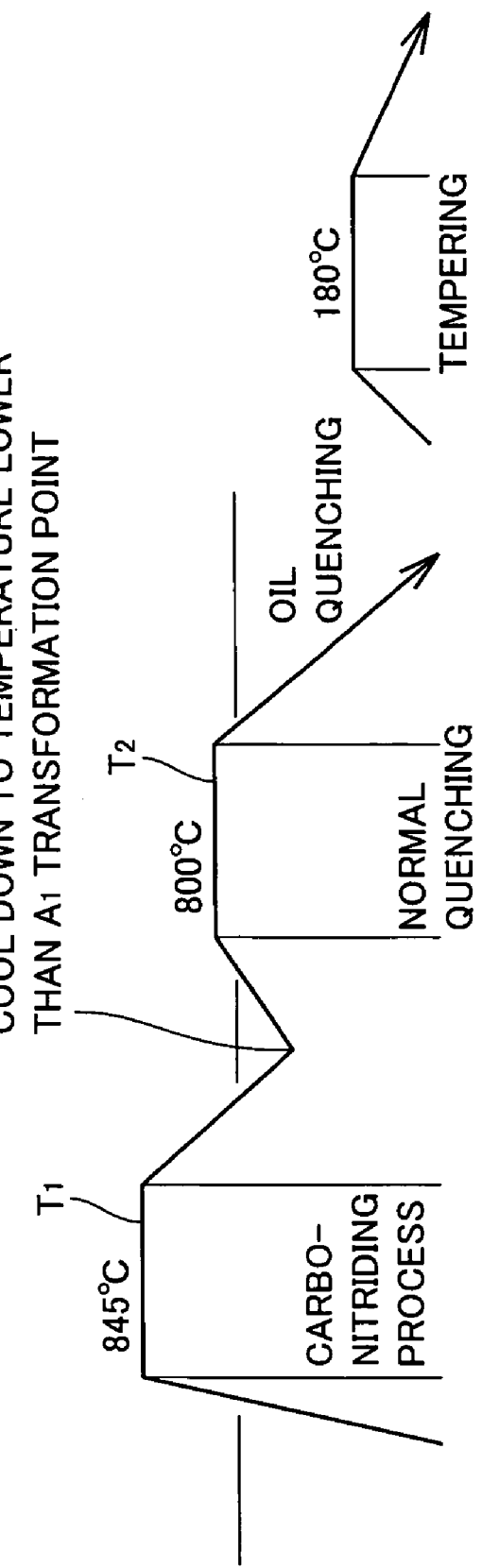
FIG. 3 is a diagram for illustrating an exemplary variation of the method of the thermal treatment applied to the compressor component (including the compressor bearing) in the embodiment of the present invention.

The heat treatment in the present embodiment of the present invention is shown in FIGS. 2 and 3. FIG. 2 shows a heat treatment pattern according to which primary quenching and secondary quenching are carried out, and FIG. 3 shows a heat treatment pattern according to which a material is cooled to a temperature lower than the $A_1$ transformation point in a quenching process and thereafter heated again to be finally quenched. Both are exemplary embodiments of the present invention.

Referring to FIG. 2, steel for a bearing's component is first heated to a temperature for carbonitriding (e.g. 845° C.) higher than the $A_1$ transformation point. At this temperature, the steel is subjected to carbonitriding process. At the temperature of a treatment $T_1$, carbon and nitrogen are diffused in a steel matrix such that the carbon can sufficiently be included in the steel. Thereafter, at the temperature of treatment $T_1$ the steel for the bearing's component is subjected to oil quenching to be cooled down to a temperature lower than the $A_1$ transformation point. Then, the steel may be subjected to tempering at 180° C. This tempering, however, may be omitted.

Thereafter, the steel is again heated to a temperature (e.g. 800° C.) of no less than the $A_1$ transformation point and less than the temperature applied to carbo-nitride the steel. At this temperature, the steel is maintained to be subjected to a treatment $T_2$. Then, at the temperature of treatment $T_2$, the steel is subjected to oil quenching to be cooled down to a temperature lower than the $A_1$ transformation point. Thereafter, the steel is subjected to tempering at 180° C.

Referring to FIG. 3, steel for a bearing's component is first heated to a temperature for carbonitriding (e.g. 845° C.) higher than the $A_1$ transformation point. At this temperature, the steel is subjected to carbonitriding process. At the temperature of treatment $T_1$, carbon and nitrogen are diffused in a steel matrix such that the carbon can sufficiently be included in the steel. Thereafter, the steel for the bearing's component is not quenched, but is cooled down to a temperature of no more than the $A_1$ transformation point. Thereafter, the steel is again heated to a temperature (e.g. 800° C.) of no less than the $A_1$ transformation point and less than the temperature applied to carbonitride the steel. At this temperature, the steel is maintained to be subjected to treatment $T_2$. Then, at the temperature of treatment $T_2$, the steel is subjected to oil quenching to be cooled down to a temperature lower than the $A_1$ transformation point. Thereafter, the steel is subjected to tempering at 180° C.

Compared with ordinary or normal quenching (by which carbonitriding is done and immediately thereafter quenching is done once), the above-discussed heat treatment can provide enhanced crack strength and reduced secular dimensional variation rate while carbonitriding the surface layer. This heat treatment can also produce a microstructure having austenite crystal grains of a grain size which is smaller than the conventional one by one half or more. The compressor component and the compressor bearing subjected to the above-described heat treatment can have a long fatigue life (or a long rolling contact fatigue life when the component is a compressor bearing), an increased anti-crack strength, and a reduced secular dimensional variation rate.

The above-described thermal treatments both allow their carbonitriding processes to produce a nitriding layer that is a "carbonitriding layer." Since the material for the carbonitriding process, the steel, has a high concentration of carbon, carbon in the atmosphere of the normal carbonitriding process might not enter the surface of the steel easily. For example, with steel having a high concentration of carbon (approximately 1% by weight), a carburized layer may have a higher concentration of carbon than this value, or a carburized layer may be formed without having a higher concentration of carbon than this value. A concentration of nitrogen in normal steel, however, is typically as low as approximately no more than 0.025 wt % at the maximum although it depends on a concentration of Cr or the like. Therefore, a nitriding layer can apparently be formed regardless of the concentration of carbon in source steel. It will be appreciated that the above-described nitriding layer may also be enriched with carbon.

Figure 4A:
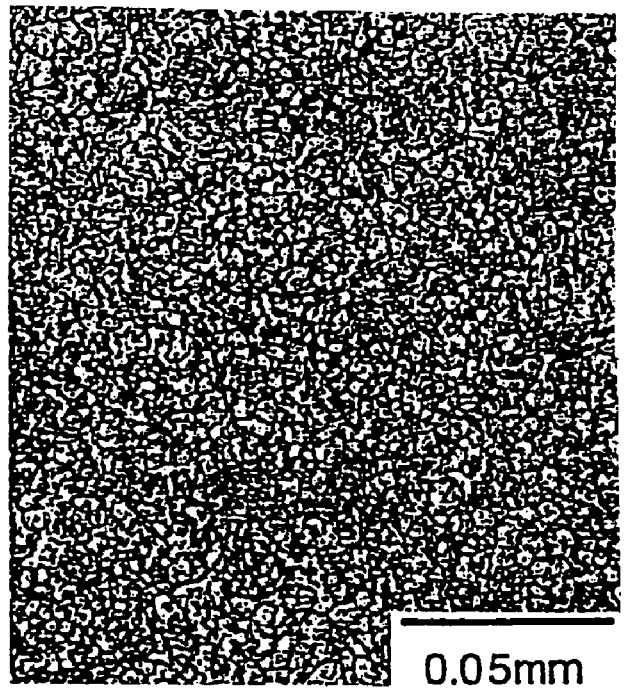
FIG. 4A shows a microstructure, specifically an austenite grain, of an exemplary bearing component in the present invention.
Figure 4B:
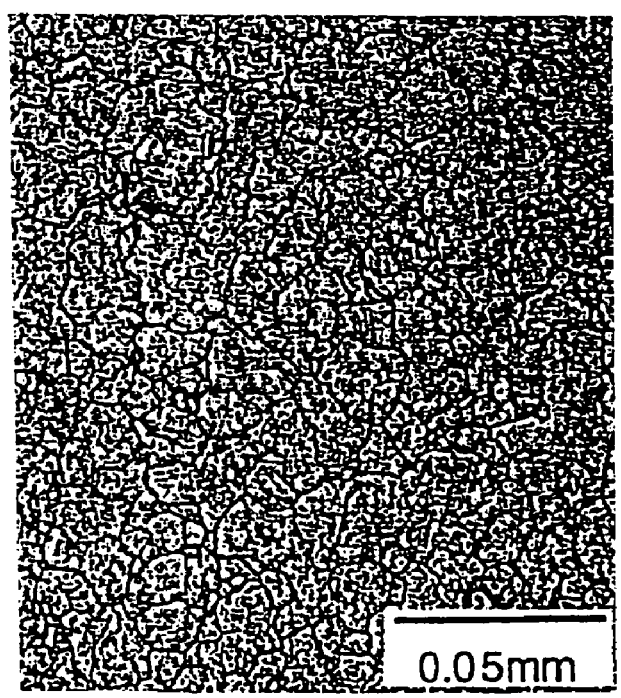
FIG. 4B shows a microstructure, specifically an austenite grain, of a conventional bearing component.
Figure 5A:
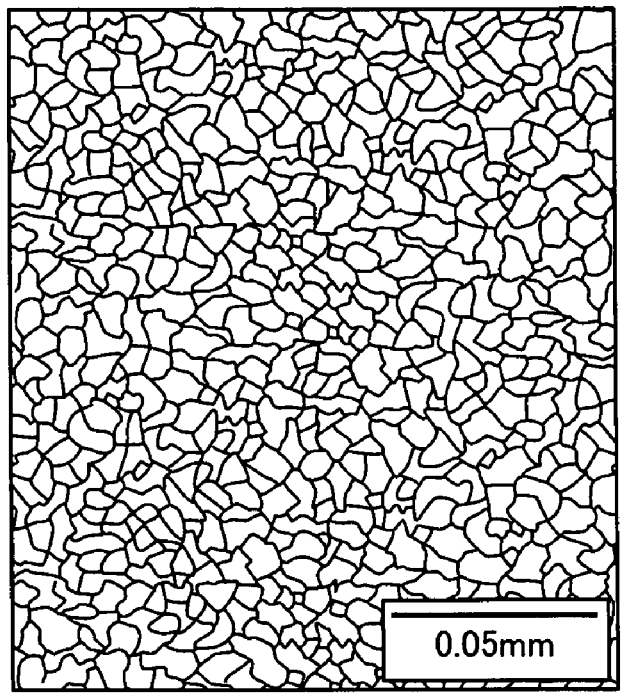
FIG. 5A shows the austenite grain boundary shown in FIG. 4A.
Figure 5B:
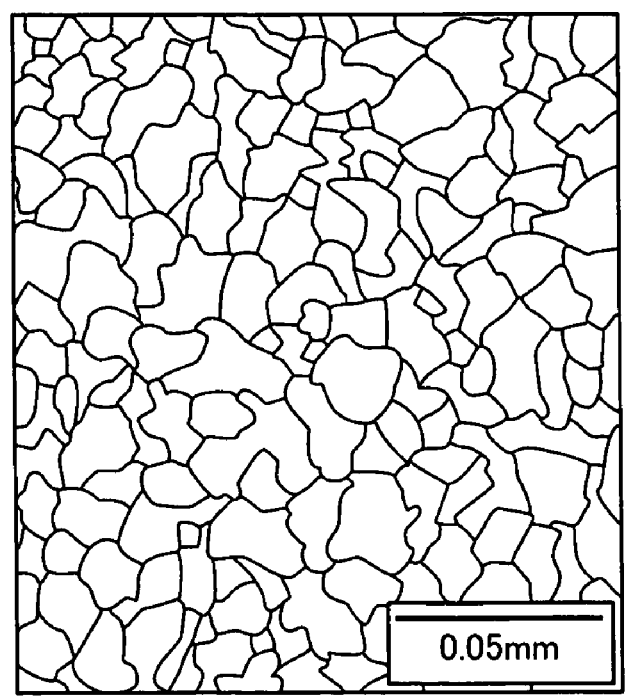
FIG. 5B shows the austenite grain boundary shown in FIG. 4B.

FIG. 4A shows a grain size of austenite of a bearing steel having been heat-treated as shown in FIG. 2. For comparison, FIG. 4B shows a grain size of austenite of a bearing steel which has undergone the conventional heat treatment. FIGS. 5A and 5B diagrammatically show the grain sizes of austenite that are shown in FIGS. 4A and 4B. In the structures with the crystal grain sizes of austenite, the grain diameter of the conventional austenite is 10 which is a grain size number defined by JIS (Japanese Industrial Standard) while that of the present invention through the heat treatment thereof is 12 and thus fine grains are seen. Further, the average grain diameter in FIG. 4A is 5.6 μm measured by the intercept method.

EXAMPLE

The present invention in examples will now be described.

Example 1

JIS-SUJ2 (1.0 wt % of C—0.25 wt % of Si—0.4 wt % of Mn—1.5 wt % of Cr) was used for Example 1 of the present invention. Samples shown in Table 1 were each produced through the procedure described below.

Samples A-D

Examples of the Present Invention

Carbonitriding was performed at 850° C. held for 150 minutes in an atmosphere of a mixture of RX gas and ammonia gas. Following the heat treatment pattern shown in FIG. 2, primary quenching was done from a carbonitriding temperature of 850° C., and secondary quenching was subsequently done by heating to a temperature in a temperature range from 780° C. to 830° C. lower than the carbonitriding temperature. Sample A with a secondary quenching temperature of 780° C. was not tested since quenching of sample A was insufficient.

Samples E and F

Examples of the Present Invention

These samples were carbonitrided through the same procedure as that of samples A-D of the present invention, and then secondary quenched at a temperature from 850° C. to 870° C. equal to or higher than the carbonitriding temperature of 850° C.

Conventional Carbonitrided Sample

Comparative Example

Carbonitriding was performed at 850° C. held for 150 minutes in an atmosphere of a mixture of RX gas and ammonia gas. Quenching was successively done from the carbonitriding temperature and no secondary quenching was done.

Normal Quenched Sample

Comparative Example

Without carbonitriding, quenching was done by increasing the temperature to 850° C. and no secondary quenching was done.

For the samples above, tests were conducted for (1) measuring the amount of hydrogen, (2) measuring crystal grain size, (3) Charpy impact test, (4) measuring fracture stress and (5) rolling fatigue test. Their results are shown in Table 1.

TABLE 1

| | Samples | | | | | | | |
|---|---|---|---|---|---|---|---|---|
| | A | B | C | D | E | F | Conventionally carbonitrided product | Normally quenched product |
| Secondary quenching temp. (° C.) | 780[1] | 800 | 815 | 830 | 850 | 870 | — | — |
| Hydrogen content (ppm) | — | 0.37 | 0.40 | 0.38 | 0.42 | 0.40 | 0.72 | 0.38 |
| Grain size No. (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| Fracture stress value (MPa) | — | 2840 | 2780 | 2650 | 2650 | 2700 | 2330 | 2770 |
| Rolling contact fatigue life ratio ($L_{10}$) | — | 5.4 | 4.2 | 3.5 | 2.9 | 2.8 | 3.1 | 1 |

[1]Not evaluated this time due to insufficient quenching.

Their measuring and test methods will now be described.

(1) Measurement of Hydrogen Amount

The amount of hydrogen was determined by means of a DH-103 hydrogen determinator manufactured by LECO Corporation to analyze the amount of non-diffusible hydrogen in a steel. The amount of diffusible hydrogen was not measured. Specifications of the LECO DH-103 hydrogen determinator are as follows.

Analysis range: 0.01-50.00 ppm

Analysis precision: ±0.1 ppm or ±3% H (higher one)

Analysis sensitivity: 0.01 ppm

Detection method: thermal conductimetry

Sample weight size: 10 mg-35 g (max: 12 mm (diameter)× 100 mm (length))

Furnace temperature range: 50° C.-1100° C.

Reagent: anhydron ($Mg(ClO_4)_2$), Ascarite, NaOH

Carrier gas: nitrogen gas, dosing gas: hydrogen gas (Both gases have a purity of at least 99.99% and a pressure of 40 PSI (2.8 kgf/cm$^2$).)

The procedure of the analysis is roughly described here. A sample was taken by a dedicated sampler and the sample together with the sampler was put into the hydrogen determiner. Diffusible hydrogen therein was directed by the nitrogen carrier gas to a thermal conductimetry detector. The diffusible hydrogen was not measured in this example. Then, the sample was taken out of the sampler to be heated in a resistance heater and non-diffusible hydrogen was directed by the nitrogen carrier gas to the thermal conductimetry detector.

The thermal conductivity was measured by the thermal conductimetry detector to determine the amount of non-diffusible hydrogen.

(2) Measurement of Crystal Grain Size

The crystal grain size was measured according to the method of testing the crystal grain size of austenite in a steel defined by JIS G 0551.

(3) Charpy Impact Test

A Charpy impact test was conducted according to the Charpy impact test method for a metal material defined by JIS Z 2242. A test piece used here was a U-notch test piece (JIS No. 3 test piece) defined by JIS Z 2202.

Note that a Charpy impact value is a value of absorption energy E, as described below, that is divided by cross section (0.8 cm$^2$).

Absorption energy E=WgR (cos βcos α)

Hammer weight W=25.438 kg

Gravitational acceleration g=9.80665 n/sec$^2$

Distance R from center of axis of rotation of hammer to center of gravity=0.6569 m Hammer lifted by angle α=146°

Hammer moved upward and downward by angle β

(4) Measurement of Fracture Stress

Figure 11:
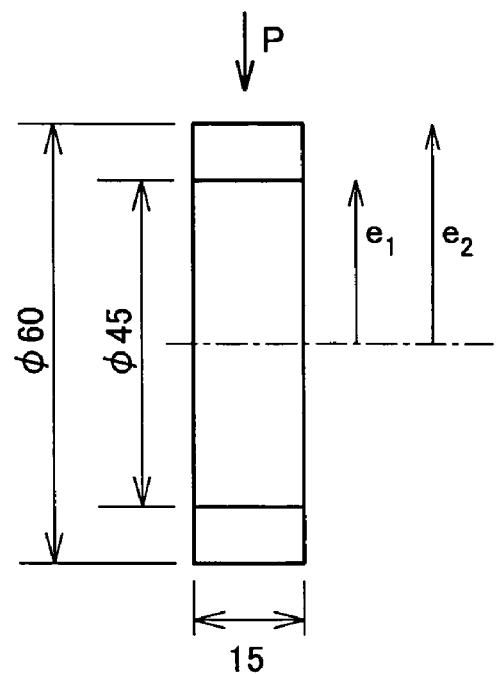
FIG. 11 shows a sample used in a static pressure fracture strength test (to measure fracture stress).

FIG. 11 shows a test piece utilized for the measurement of fracture stress. Amsler universal testing machine was employed. A load was exerted in direction P in the figure and the load when the test piece was fractured was measured. Then, the measured load which was a fracture load was converted into a stress by the following stress calculation formula for a curved beam. It is noted that the test piece to be used is not limited to the one shown in FIG. 11 and may be any test piece having a different shape.

Suppose that a fiber stress on the convex surface of the test piece shown in FIG. 11 is $\sigma_1$ and a fiber stress on the concave surface is $\sigma_2$, then, $\sigma_1$ and $\sigma_2$ are determined by the following formula (JSME Mechanical Engineer's Handbook, A4-strength of materials, A4-40). Here, N indicates an axial force of a cross section including the axis of the annular test piece, A indicates a cross-sectional area, $e_1$ indicates an outer radius, $e_2$ indicates an inner radius, and κ is a section modulus of the curbed beam.

$$\sigma_1=(N/A)+\{M/(A\rho_o)\}[1+e_1/\{\kappa(\rho_o+e_1)\}]$$

$$\sigma_1=(N/A)+\{M/(A\rho_o)\}[1-e_2/\{\kappa(\rho_o-e_2)\}]$$

$$\kappa=-(1/A)\int_A\{\eta/(\rho_o+\eta)\}dA$$

(5) Rolling Fatigue Test

Figure 12A:
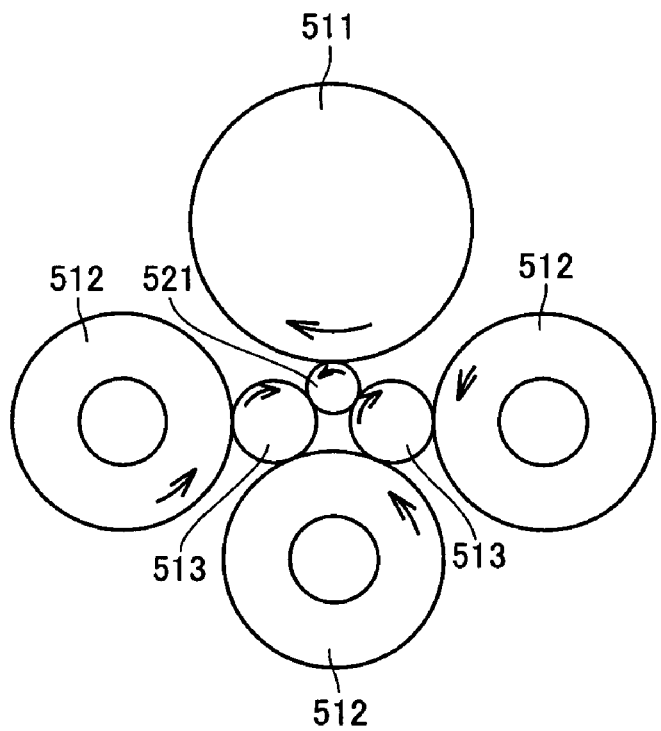
FIG. 12A is a schematic front view of a rolling contact fatigue life tester.
Figure 12B:
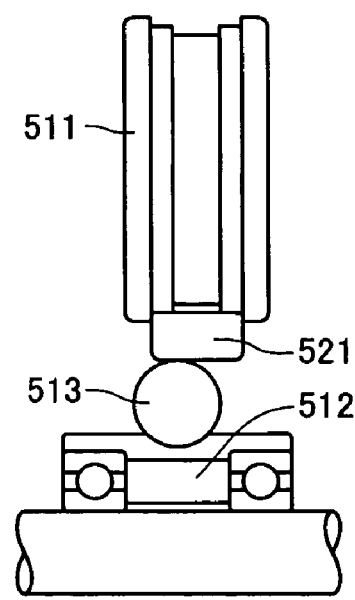
FIG. 12B is a schematic side view of the rolling contact fatigue life tester.

The rolling fatigue life tester is shown in FIGS. 12A and 12B in its simplified form, and test conditions for a rolling fatigue life test are shown in Table 2. Referring to FIGS. 12A and 12B, a test piece 521 undergoing the rolling fatigue life test was driven by a driving roll 511 to rotate while being in contact with balls 513. Balls 513 were (¾)" balls guided by a guiding roll 512 to roll. Balls 513 exerted a high surface pressure on test piece 521 while test piece 521 also exerted a high surface pressure on balls 513.

The results of the above-described measurements and tests will now be described.

(1) Amount of Hydrogen

Table 1 shows that the conventional carbonitrided sample without being additionally processed has a considerably large hydrogen amount in the steel that is 0.72 ppm. A reason therefor is considered that ammonia (NH$_3$) contained in the atmosphere in the carbonitriding process is decomposed and then hydrogen enters the steel. On the other hand, the hydrogen amount in the steel of samples B-F is reduced to 0.37-0.42 ppm and thus almost a half of that of the conventional sample. This amount of hydrogen in the steel is substantially equal in level to that of the normal quenched sample.

The above-mentioned reduction of the hydrogen amount in the steel can lessen the degree of embrittlement of the steel that is due to hydrogen in the solid solution. In other words, by the reduction of the hydrogen amount, the Charpy impact value and the fracture stress value of samples B-F of the present invention are remarkably improved.

(2) Crystal Grain Size

With reference to Table 1, regarding the crystal grain size, samples that are secondary quenched at a temperature lower than the quenching temperature in the carbonitriding process (primary quenching), namely samples B-D have austenite grains which are remarkably made fine, i.e., crystal grain size number is 11-12. Samples E and F as well as the conventional carbonitrided sample and the normal quenched sample have austenite grains with the crystal grain size number of 10, which means that the crystal grain size of samples E and F is greater than that of samples B-D.

(3) Charpy Impact Value

Table 1 shows that the Charpy impact value of the conventional carbonitrided sample is 5.33 J/cm$^2$ while those of samples B-F of the present invention are higher, ranging from 6.20 to 6.65 J/cm$^2$. It is also seen from this that a lower secondary quenching temperature leads to a higher Charpy impact value. The normal quenched sample has a high Charpy impact value of 6.70 J/cm$^2$.

(4) Measurement of Fracture Stress Value

The fracture stress corresponds to anti-crack strength. It is seen from Table 1 that the fracture stress of the conventional carbonitrided sample is 2330 MPa. On the other hand, the fracture stresses of samples B-F are improved to 2650-2840 MPa. The normal quenched sample has a fracture stress of 2770 MPa which is in the range of the fracture stress of samples B-F. It is considered that the reduction in hydrogen content greatly contributes to the improved anti-crack strength of samples B-F as well as the reduction in size of austenite crystal grains.

(5) Rolling Fatigue Test

According to Table 1, the normal quenched sample has the shortest rolling fatigue life (L$_{10}$) due to the absence of a nitriding layer in the surface layer. In contrast, the rolling fatigue life of the conventional carbonitrided sample is 3.1 times as long as that of the normal quenched sample. The rolling fatigue life of samples B-D is remarkably improved as compared with the conventional carbonitrided sample. Samples E and F have the rolling fatigue life almost equal to that of the conventional carbonitrided sample.

In summary, the hydrogen content in the steel can be reduced in samples B to F according to the present invention. Thus, the improved fracture stress and Charpy impact values can be achieved in samples B to F. In addition to these fracture stress value and Charpy impact value, the rolling contact fatigue life should desirably be improved. This can be achieved only in samples B to D having even smaller grains with an austenite grain size number of at least approximately 11. Samples B to F correspond to examples in accordance with the present invention, however, the more desirable scope of the present invention is that corresponding to samples B to D that have been subjected to the secondary quenching at a temperature lower than that applied to carbo-nitride the steel and thus has even smaller grains.

Example 2

Example 2 of the present invention is now described.

On the following samples X, Y and Z, a series of tests was conducted. A material to be heat-treated that was employed commonly to samples Y-Z was JIS-SUJ2 (1.0 wt % of C—0.25 wt % of Si—0.4 wt % of Mn—1.5 wt % of Cr). Samples X-Z were each processed through the following procedure.

Sample X—comparative example: normal quenching only (without carbonitriding)

Sample Y—comparative example: quenching directly after carbonitriding (conventional carbonitriding and quenching)

Carbonitriding was conducted at 845° C. held for 150 minutes. The atmosphere in the carbonitriding process was a mixture of RX gas and ammonia gas.

Sample Z—example of the present invention: A bearing material was processed following the heat treatment pattern shown in FIG. 2. Carbonitriding was conducted at 845° C. held for 150 minutes. The atmosphere in the carbonitriding process was a mixture of RX gas and ammonia gas. Final quenching temperature was 800° C.

(1) Rolling Fatigue Life

Test conditions and the test device for the rolling fatigue life test are as shown in Table 2 and FIGS. 12A and 12B. Results of the rolling fatigue life test are shown in Table 3.

TABLE 2

| Test piece | φ 12 × L22 cylindrical test piece |
|---|---|
| Number of tested pieces | 10 |
| Counterpart steel ball | ¾" (19.05 mm) |
| Contact surface pressure | 5.88 Gpa |
| Load speed | 46240 cpm |
| Lubricating oil | Turbine VG68 - forced circulation lubrication |

TABLE 3

| | Life (load count) | | |
|---|---|---|---|
| Sample | $L_{10}$ (×10$^4$ times) | $L_{10}$ (×10$^4$ times) | Relative $L_{10}$ |
| X | 8017 | 18648 | 1.0 |
| Y | 24656 | 33974 | 3.1 |
| Z | 43244 | 69031 | 5.4 |

According to Table 3, carbonitrided sample Y (comparative example) has a rolling fatigue life ($L_{10}$ life: one out of ten test pieces being damaged) that is 3.1 times as long as that of sample X (comparative example) which undergoes normal quenching only, and thus it is seen that the effect of extending the life is obtained through the carbonitriding process. In contrast, sample Z of the present invention has a longer life which is 1.74 times as long as that of sample Y and 5.4 times as long as that of sample X. It is considered that this improvement is obtained mainly from the fine microstructure.

(2) Charpy Impact Test

A Charpy impact test was conducted by using a U-notch test piece defined by JIS Z 2242 mentioned above. Test results are shown in Table 4.

TABLE 4

| Sample | Charpy impact value (J/cm$^2$) | Relative impact value |
|---|---|---|
| X | 6.7 | 1.0 |
| Y | 5.3 | 0.8 |
| Z | 6.7 | 1.0 |

Sample Z of an example of the present invention achieved a Charpy impact value equal to that of sample X (comparative example) having undergone only normal quenching and higher than that of carbonitrided sample Y (comparative example).

(3) Static Fracture Toughness Test

Figure 13:
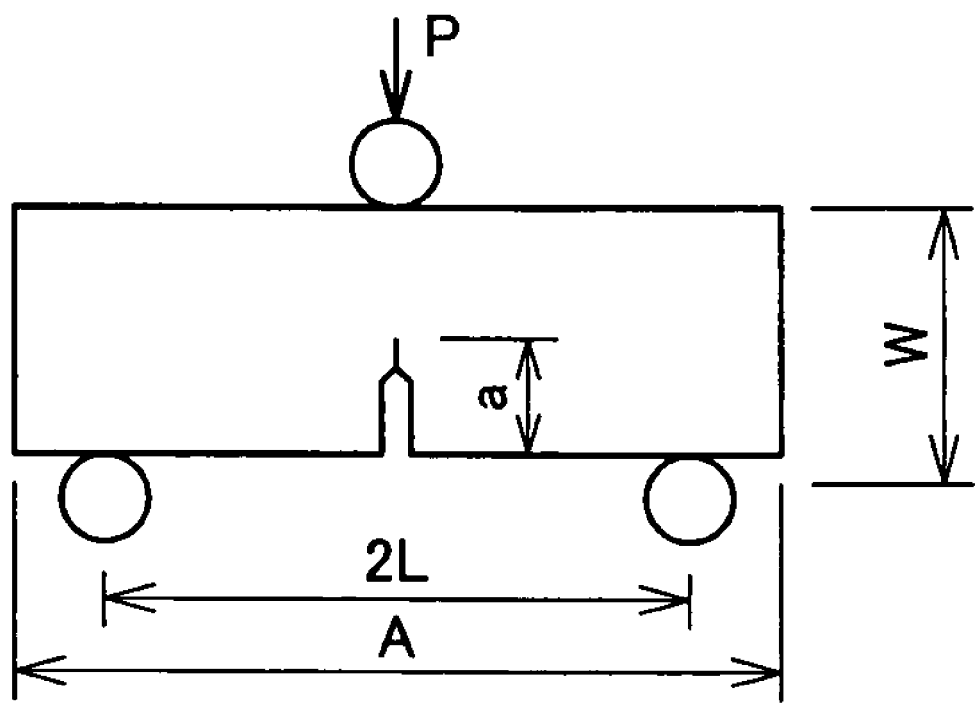
FIG. 13 shows a sample used in a static fracture toughness test.

The test piece shown in FIG. 13 was used for the static fracture toughness test. In this test piece, a pre-crack of approximately 1 mm was made, thereafter a static load P by three-point bending was added, and then a fracture load was determined. Using the following formula, a fracture toughness value ($K_{Ic}$ value) was calculated. Results of the test are shown in Table 5.

$$K_{Ic}=(PL\sqrt{a}/BW^2)\{5.8-9.2(a/W)+43.6(a/W)^2-75.3(a/W)^3+77.5(a/W)^4\}$$

TABLE 5

| Sample | Number tested | $K_{1C}$ (MPa$\sqrt{m}$) | Relative $K_{1C}$ |
|---|---|---|---|
| X | 3 | 16.3 | 1.0 |
| Y | 3 | 16.1 | 1.0 |
| Z | 3 | 18.9 | 1.2 |

As the previously introduced crack has a depth greater than the depth of the nitriding layer and thus the same results are obtained for samples X and Y (comparative examples), while sample Z (example of the present invention) achieves a fracture toughness value ($K_{Ic}$ value) approximately 1.2 times as high as those of samples X and Y (comparative examples).

(4) Static-Pressure Fracture-Strength Test (Measurement of Fracture Stress)

A static-pressure fracture-strength test piece as shown in FIG. 11 described above was used. A load was exerted in direction P in the figure to conduct a static-pressure fracture-strength test just as described above. Test results are shown in Table 6.

TABLE 6

| | Test Results | | |
|---|---|---|---|
| Sample | Number tested | Static fracture strength (kgf) | Relative static fracture strength |
| X | 3 | 4200 | 1.00 |
| Y | 3 | 3500 | 0.84 |
| Z | 3 | 4300 | 1.03 |

Carbonitrided sample Y (comparative example) has a value of a static-pressure fracture-strength slightly smaller than that of sample X (comparative example) having been subjected to normal quenching alone. In contrast, sample Z of an example of the present invention has a static-pressure fracture-strength value considerably higher than that of sample Y and slightly higher than that of sample X.

(5) Rate of Secular Dimensional Variation

Table 7 shows the rate of secular dimensional variation measured under the conditions of 130° C. (holding temperature) and 500 hours (holding time), together with the surface hardness and the amount of retained austenite (at 0.1 mm depth from the surface).

TABLE 7

| Sample | Number tested | Surface hardness (HRC) | Retained γ (vol. %) | Rate of dimensional change (×10$^{-5}$) | Relative rate of dimensional change*[)] |
|---|---|---|---|---|---|
| X | 3 | 62.5 | 9.0 | 18 | 1.0 |
| Y | 3 | 63.6 | 28.0 | 35 | 1.9 |
| Z | 3 | 60.0 | 11.3 | 22 | 1.2 |

*[)]smaller is superior

As compared with the rate of dimensional variation of sample Y having a large amount of retained austenite, sample Z of an example of the present invention has a lower rate of dimensional variation.

(6) Life Test Under Contaminated Lubricant Condition

Ball bearing 6206 was used to evaluate the rolling fatigue life under a contaminated lubricant condition having a predetermined amount of normal contaminants mixed therein. Test conditions are shown in Table 8 and test results are shown in Table 9.

TABLE 8

| | |
|---|---|
| Load | Fr = 6.86 kN |
| Contact surface pressure | Pmax = 3.2 Gpa |
| Rate of rotation | 2000 rpm |
| Lubricant | Turbine 56 - oil bath lubrication |
| Amount of contaminant | 0.4 g/1000 cc |
| Contaminant | Grain size: 100-180 μm, hardness: Hv800 |

TABLE 9

| Sample | $L_{10}$ life (h) | Relative $L_{10}$ |
|---|---|---|
| X | 20.0 | 1.0 |
| Y | 50.2 | 2.5 |
| Z | 74.0 | 3.7 |

Sample Y (comparative example) having undergone carbonitriding has a lifetime which is approximately 2.5 times as long as that of sample X, and sample Z of the present invention has a lifetime which is approximately 3.7 times as long as that of sample X. While sample Z of the present invention has a smaller amount of retained austenite than that of sample Y of the comparative example, sample Z has a long lifetime because of influences of entering nitrogen and the fine microstructure.

It is accordingly seen from the above-discussed results that, sample Z of the present invention, namely a compressor component and a compressor bearing produced by the heat treatment method of the present invention can simultaneously achieve three goals: extension of the fatigue life (the rolling fatigue life in the compressor bearing) that has been difficult to achieve by the conventional carbonitriding, improvement in crack strength and reduction of the rate of secular dimensional variation.

Note that in this specification the austenite grains refer to crystal grains of austenite which is phase-transformed during the heating process, and the traces of grains remain after the austenite is transformed into martensite through cooling.

For example, the needle roller bearing may be a full type roller bearing or a shell type needle roller bearing.

The present invention may advantageously be applied, in particular, to a compressor component and a compressor bearing having a long rolling fatigue life, a high anti-crack strength, and a reduced secular dimensional variation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A compressor bearing component incorporated into a compressor having a compressor body and a pulley mechanism transmitting a driving force to said compressor body, said bearing component having an austenite grain with a grain size number falling within a range exceeding 10, a fracture stress value of at least 2650 MPa, and a hydrogen content of at most 0.5 ppm.

2. A compressor bearing for use in a compressor having a compressor body and a pulley mechanism transmitting a driving force to said compressor body, wherein
at least one member of a member having a railway surface and a plurality of rolling elements included in said compressor bearing has an austenite grain with a grain size number falling within a range exceeding 10, a fracture stress value of at least 2650 MPa, and a hydrogen content of at most 0.5 ppm.

3. The compressor bearing according to claim 2, wherein said compressor bearing is a swash plate support bearing rotatably supporting a swash plate and a rotating member of said compressor body.

4. The compressor bearing according to claim 3, wherein said swash plate support bearing is a needle roller thrust bearing.

5. The compressor bearing according to claim 2, wherein said compressor bearing is a rotating member/pulley support member bearing rotatably supporting a rotating member of said compressor body and a pulley bearing support member of said pulley mechanism.

6. The compressor bearing according to claim 5, wherein said rotating member/pulley support member bearing is a needle roller thrust bearing.

7. The compressor bearing according to claim 2, wherein said compressor bearing is a main shaft support bearing rotatably supporting a main shaft of said compressor body and a pulley bearing support member of said pulley mechanism.

8. The compressor bearing according to claim 2, wherein said compressor bearing is a pulley support bearing rotatably supporting a pulley and a pulley bearing support member of said pulley mechanism.

* * * * *